United States Patent
Labrozzi et al.

(10) Patent No.: US 7,864,840 B2
(45) Date of Patent: Jan. 4, 2011

(54) SCENE-BY-SCENE DIGITAL VIDEO PROCESSING

(75) Inventors: Scott C. Labrozzi, Cary, NC (US); James D. Zimmerman, Rapid City, SD (US); Philip G. Jacobsen, Durham, NC (US)

(73) Assignee: Inlet Technologies, Inc., Raleigh, NC (US)

( * ) Notice: Subject to any disclaimer, the term of this patent is extended or adjusted under 35 U.S.C. 154(b) by 1632 days.

(21) Appl. No.: 11/106,906

(22) Filed: Apr. 15, 2005

(65) Prior Publication Data

US 2006/0233236 A1    Oct. 19, 2006

(51) Int. Cl.
*H04N 7/12*      (2006.01)
(52) U.S. Cl. .............. 375/240.03; 375/240.02; 375/240.12
(58) Field of Classification Search .......... 375/240, 375/240.01, 240.02, 240.03, 240.12
See application file for complete search history.

(56) References Cited

U.S. PATENT DOCUMENTS

| | | | |
|---|---|---|---|
| 6,040,861 A | 3/2000 | Boroczky et al. | |
| 6,040,881 A | 3/2000 | Koyama | |
| 6,097,757 A | 8/2000 | Boice et al. | |
| 6,643,327 B1 * | 11/2003 | Wang | 375/240.12 |
| 6,763,138 B1 | 7/2004 | Yokoyama | |
| 2002/0021756 A1 | 2/2002 | Jayant et al. | |
| 2002/0041628 A1 | 4/2002 | Andersson et al. | |
| 2002/0126754 A1 | 9/2002 | Shen et al. | |
| 2002/0171566 A1 | 11/2002 | Huang et al. | |
| 2003/0048846 A1 | 3/2003 | Lee | |
| 2003/0113097 A1 | 6/2003 | Shibutani | |
| 2003/0123545 A1 | 7/2003 | Prakash et al. | |
| 2003/0128758 A1 | 7/2003 | Prakash et al. | |
| 2003/0128759 A1 | 7/2003 | Prakash et al. | |
| 2004/0218093 A1 | 11/2004 | Radha et al. | |
| 2004/0240844 A1 | 12/2004 | Ostermann et al. | |
| 2005/0053352 A1 | 3/2005 | McKain et al. | |

FOREIGN PATENT DOCUMENTS

| | | |
|---|---|---|
| EP | 0 708 564 A2 | 4/1996 |
| EP | 1 441 532 A2 | 7/2004 |

OTHER PUBLICATIONS

International Search Report for PCT Application No. PCT/US2006/013862; mailed on Aug. 9, 2006 (4 pgs.).
Written Opinion of the International Searching Authority for PCT Application No. PCT/US2006/013862; mailed on Aug. 9, 2006 (5 pgs.).
Yokoyama Y. et al. "A scene-adaptive one-pass variable bit rate video coding method for storage media" IEEE, vol. 3, Oct. 24, 1999, pp. 827-831.

* cited by examiner

*Primary Examiner*—Allen Wong
(74) *Attorney, Agent, or Firm*—Myers Bigel Sibley & Sajovec

(57) ABSTRACT

A scene-by-scene (S×S) compression process enables improved visual quality within applicable compression constraints to be obtained. A compressed video signal is analyzed, generating compression statistics. A scene of the video signal is identified for re-compression and a maximum target bit rate for re-compressing the identified scene is determined based on the compression statistics and applicable compression constraints. A target bit rate for re-compressing the scene is selected based on the maximum target bit rate, and compression parameters for the scene are determined based on the scene's compression statistics and the selected target bit rate.

24 Claims, 4 Drawing Sheets

SCENE-BY-SCENE DIGITAL VIDEO PROCESSING

This application relates to digital video signal processing methods and apparatus and more particularly to methods and apparatus for processing selected video scenes.

BACKGROUND

An uncompressed digital video signal represents an enormous amount of digital data. In general, a video signal is a succession of frames, or pictures, and the number of frames per second is called the frame rate. Each frame is a two-dimensional array of picture elements, or pixels, and the size of this array determines the frame's width and height. In a digital video signal, each pixel is represented by a number of bits that defines the pixel's color, brightness, etc.

Standard definition (SD) television (TV) may be broadcast as pictures of 640 pixels×480 lines, or 4:3 aspect ratio, that vertically refresh at 24, 30, or 60 frames per second. High definition (HD) TV pictures include much more data than SD TV pictures. An HD TV picture has a 16:9 aspect ratio and may include, for example, either 1920 pixels×1080 lines that are interlacedly scanned or 1280 pixels×720 lines that are progressively scanned. Each video frame in an interlaced system consists of two fields that are transmitted at twice the frame rate.

The aggregate data rate of a digital video signal is simply the number of bits per pixel times the number of pixels per frame times the frame rate. For example, an HD digital video signal may have 20 bits/pixel, a size of 1920×1080 pixels, and a frame rate of 30 frames per second. The aggregate data rate of such an HD digital video signal is 1,244,160,000 bits per second (about 1.2 Gigabits/s (Gbps)), which is high enough that it can be difficult to handle today. To put this into further perspective, a 2-hour movie at this data rate is 8640 Gigabits, or 1080 Gigabytes (GB). One of today's common digital video disks (DVDs) can store 4.7 GB of data, and thus 229 such DVDs would be needed to store one 2-hour uncompressed HD movie.

Simply because of a digital video signal's high data rate and enormous size, nearly all current digital video applications employ compression, or encoding, to minimize the space and bandwidth required to store and transmit video. Before compressed video can be viewed or displayed, the compressed video must be decompressed, or decoded, back to a raw form. There exist video compression techniques or formats that are lossless, which means that bit for bit the original pixel data can be reconstructed from the compressed form. Nevertheless, lossless compression formats are not nearly as effective at reducing a video signal's data rate and size as are lossy compression techniques. With lossy compression, there is no guarantee that bit for bit the original pixel data can be reconstructed from the compressed form.

Lossy encoding algorithms include MPEG-2, which is standardized by the Moving Pictures Experts Group (MPEG) that is officially designated ISO/IEC JTC1/SC29 WG11 as ISO standard 13818. MPEG-2 is used for digital SD TV signals and HD TV signals. More advanced algorithms include MPEG-4 part 10 and the advanced video codec (AVC) of MPEG-4, Windows Media 9 (WM9) that is promulgated by Microsoft Corp., and WM9 as adapted and standardized by the Society of Motion Picture and Television Engineers (SMPTE), currently identified as VC9 or VC1.

A video image input to the MPEG-2 algorithm is separated into a luminance (Y) channel that represents brightness information in the image and two chrominance (U, V) channels that represent color information in the image. An input image is also divided into "macroblocks", with each macroblock comprising four 8 pixel×8 pixel luminance blocks and, depending on the image's chrominance format, a number of 8 pixel×8 pixel chrominance blocks. For example, a macroblock may include six blocks: four luminance blocks for the Y channel and one chrominance block for each of the U and V channels. An 8×8 discrete cosine transform (DCT) is applied to each macroblock. The resulting DCT coefficients are then quantized, re-ordered to increase the occurrence of long runs of zeroes, and run-length coded. Run-length coding compresses the image by storing runs of data (i.e., sequences of the same data value) as single data values and associated counts. The result is then Huffman-coded.

The bitstream generated by an MPEG-2 encoder is organized into frames that are intra coded (I-pictures), forward predictive coded (P-pictures), or bidirectional predictive coded (B-pictures). I-pictures in an MPEG-2 bitstream result from encoding actual input images. P- and B-pictures result from motion-compensating input images before encoding. Motion compensation involves correlating an input image with the previous image, for P- and B-pictures, and with the next image, for B-pictures. Thus, each macroblock in a P- or B-picture is associated with an area in the next and/or previous image that is well-correlated with it. A "motion vector" that maps the macroblock to its correlated area is encoded, and then the difference between the two areas is encoded. It will be appreciated that adjacent frames in a video stream can be well correlated, and so P-pictures may have 90% less data than I-pictures and B-pictures may have 98% less data than I-pictures. On the other hand, an encoder needs significantly more time to encode B-pictures than it does to encode I-pictures. This sort of processing is typical of many compression algorithms besides MPEG-2.

Compression may be done in one pass or multiple passes over the video signal. During typical one-pass compression, the compressor, or encoder, examines the video signal once on a frame-by-frame basis and decides how best to compress each frame based on what it learns about each frame. The video for live broadcast TV applications is one-pass compression. A common form of multi-pass compression is two-pass compression, in which during the first pass, a compressor examines the video on a frame-by-frame basis and gathers information about each frame. After the first pass, the compressor can use the information gathered about all frames to decide how best to compress each frame.

While two-pass compression can typically generate higher quality video than one-pass compression, it usually does not generate the highest quality possible. Particularly where the compressed video asset will have a long shelf life, such as DVDs of popular movies, it is often the desire of the video content owner to obtain the highest possible visual quality for a given aggregate data rate. Nearly all video compression processes have constraints that regulate the aggregate data rates of their compressed signals. The successful use of lossy video compression usually involves simultaneously minimizing the aggregate data rate of the compressed signal, or at least selectively controlling the aggregate data rate to allocate more bits to selected scenes, and maximizing the visual quality of the decompressed result, which is to say, minimizing perceivable differences between original and decompressed video frames.

Various devices and methods have been developed that permit or facilitate the manipulation of streams of data, such as digital video. One example is described in U.S. Patent Application Publication No. US 2004/0240844 by Ostermann et al., which states that it describes a method for editing a data stream on a DVD stream recorder that includes parsing stream object files and identifying logical sections based on the parsing.

SUMMARY

This application describes a scene-by-scene (SxS) compression process that enables nearly maximal visual quality to be obtained within applicable compression constraints.

In one aspect of this invention, there is provided a method of processing an input compressed video signal that includes a succession of image frames. The method includes the steps of analyzing the input compressed video signal to generate one or more compression statistics; identifying a scene of the input compressed video signal for re-encoding based on either or both of the input compressed video signal and the compression statistics; determining a maximum target bit rate for re-encoding the identified scene based on the compression statistics and applicable compression constraints; selecting a target bit rate for re-encoding the identified scene based on the determined maximum target bit rate; and determining compression parameters for the identified scene based on the identified scene's compression statistics and the selected target bit rate.

In another aspect of the invention, there is provided a computer-readable medium containing a computer program for processing an input compressed video signal that includes a succession of image frames. The computer program performs the steps of analyzing the input compressed video signal to generate one or more compression statistics; identifying a scene of the input compressed video signal for re-encoding based on either or both of the input compressed video signal and the compression statistics; determining a maximum target bit rate for re-encoding the identified scene based on the compression statistics and applicable compression constraints; selecting a target bit rate for re-encoding the identified scene based on the determined maximum target bit rate; and determining compression parameters for the identified scene based on the identified scene's compression statistics and the selected target bit rate.

BRIEF DESCRIPTION OF THE DRAWINGS

The features, objects, and advantages of Applicants' invention will be understood by reading this description in conjunction with the accompanying drawings, in which.

DETAILED DESCRIPTION

Overview

Figure 1:
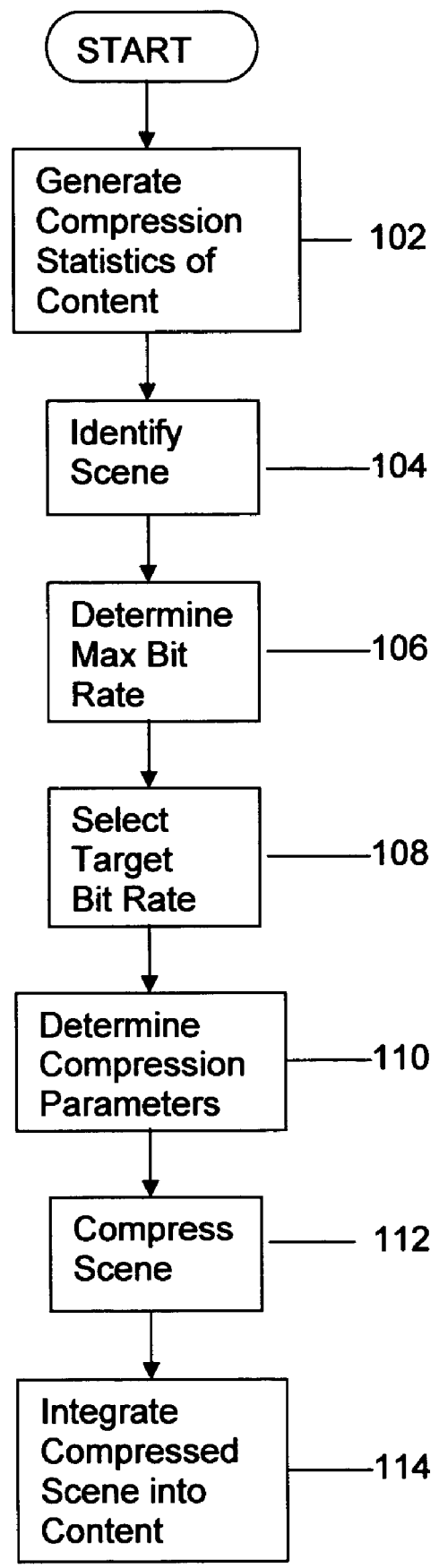
FIG. 1 is a flow diagram of a scene-by-scene compression process.

It is currently believed that the information content handled by the SxS compression process is most likely to be video source material that has been compressed, although it should be appreciated that any digital signal having comparable properties can be handled. Compressed images to be encoded can be high-resolution images, such as HD TV, and even higher-resolution images, including image formats such as 30-frame/second interlaced, 720-line progressive at 24, 30, and 60 frames/second, 1080-line interlaced, and 1080-line progressive at 60 frames/second. FIG. 1 is a flow diagram of an SxS compression process in accordance with this invention, and it will be understood that this process can be carried out as program code executed by a suitable processor, such as a personal computer (PC).

As explained in more detail below, the first step of the process is analyzing the input content to generate one or more compression statistics (step 102). This analysis may be carried out during compression of the original source material, or after the original material has been compressed, or both.

In another step of the process, one or more scenes or segments of the original compressed content are identified and marked for re-encoding based on either or both of the original compressed content and the compression statistics (step 104). For a scene to be re-encoded, minimum and maximum target bit rates for re-encoding the scene are determined based on the compression statistics and applicable compression constraints (step 106), and a target bit rate for re-encoding is selected based on the minimum and maximum target bit rates for the scene (step 108).

Compression parameters for a scene to be re-encoded are determined based on the original compressed content's compression statistics and the selected target bit rate (step 110), and the original source content for a scene to be re-encoded is compressed based on the determined compression parameters, thereby generating a new compressed scene (step 112).

The visual quality of the new compressed scene is checked, perhaps by a viewer, and if it is deemed suitable, the new compressed scene is integrated into the original compressed content, replacing the original compressed scene (step 114). Because a good judge of visual quality, and perhaps the one that matters the most, is a human perceiver, it is advantageous to allow human interaction with the compression process. Even so, the compression process must remain bounded by its constraints.

Compressing Content

Figure 2A:
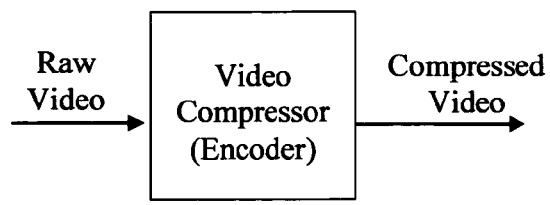
FIG. 2A is a block diagram of a one-pass video compressor.
Figure 2B:
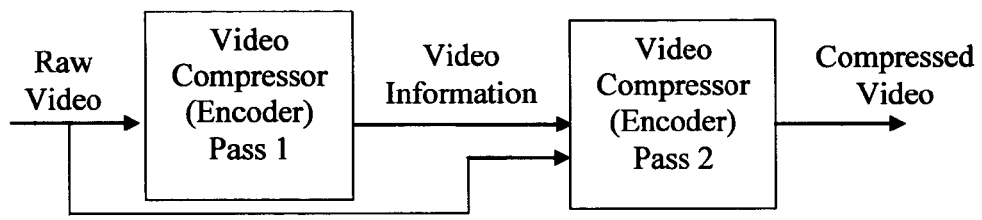
FIG. 2B is a block diagram of a two-pass video compressor.

The SxS compression method can be applied to compressed content that has undergone any number of compression passes. FIG. 2A depicts an encoder used for one-pass compression of input raw video content, and FIG. 2B depicts an encoder used for two-pass compression of input raw video content. It will be understood that the encoder is commonly implemented as a processor, such as a computer, application specific integrated circuit (ASIC), or logic that carries out program code, and a computer typically includes a display, keyboard, and other input/output components (not shown). Another suitable encoder is described in U.S. patent application Ser. No. 10/935,991 filed on Sep. 8, 2004, by N. Page et al., for "Slab-Based Processing Engine for Motion Video". FIG. 2B shows the same encoder hardware used successively for both compression passes, but it will be appreciated that in general dedicated encoders could be used for respective passes.

The compression passes may be of constant bit rate (CBR) or variable bit rate (VBR) forms. In CBR compression, the encoder is typically regulated to achieve a target average bit rate of the compressed video over a specific buffer delay or size. In VBR compression, the encoder is often regulated to achieve a target average bit rate over an entire clip, or segment, and throughout the clip is constrained by a peak bit rate that should not be exceeded over a peak buffer delay or size. Target average bit rate, peak bit rate, buffer size, and peak buffer size are compression constraints that make up compression profiles, which usually can not be violated.

Analyzing Compressed Content

The S×S compression process described here enables more or fewer data bits to be readily allocated to selected scenes of the content within the content's compression constraints. To do this, the S×S compression process uses statistics about the encoded content in order to determine (re-)encoding parameters for a scene selected for re-encoding. These compression statistics can be determined at the time of compression (e.g., during any or all passes), or they can be determined after the original raw content has been compressed. The compression statistics used by the S×S compression process include:

frame number or time-code;
frame type (e.g., I-, P-, or B-picture, etc.);
compressed bit rate;
compressed frame size;
frame-average quantization level;
buffer fullness; and
frame complexity.

In order to correctly perform a re-encode, the S×S process needs to know the frames to re-encode (frame number), and if the S×S process is to adjust bit allocations, it needs to know the frame type (because I-frames take more bits), the quantization level (because lower quantization levels require more bits), and the frame complexity (because more complex frames take more bits). In order to not exceed encoding constraints, the S×S process needs to determine the buffer fullness statistic, which can typically be computed as a function of frame size.

With respect to the frame type statistic, those of ordinary skill in this art will appreciate that I-, P-, and B-pictures are well known types today and that other types can exist. For example, a B-frame is typically a frame that has only two anchors, but in AVC, a frame can have many reference frames. The complexity statistic can be computed in various ways as there is currently no standard for it; several such ways are described in this patent application and others are expected to be suitable. Buffer fullness values may easily be calculated for every frame. For example, the WM9 encoder optionally computes and allows the buffer fullness value to be included in the bitstream itself, from which it can be easily read out. In general, computing the buffer fullness statistic is straightforward, and encoding formats typical detail how this is done.

Although it is not strictly necessary to the S×S process, determining and displaying the compressed bit rate statistic is advantageous in that it enables a user to see an easily comprehensible indicator of adjustments carried out by the S×S process. The compressed bit rate statistic is simply an average calculated over a sliding interval of a number of frames. It is currently believed that an average over a sliding interval of 150 frames is suitable, although it is expected that other intervals could be used as the number of frames may be a function of the buffer size, frame rate, and (peak or target) bit rate.

Those of ordinary skill in this art will understand that the compression statistics can be readily determined by parsing the bitstream. For example, an encoder such as that described in U.S. patent application Ser. No. 10/935,991 cited above can make available in real time the frame number, time code, type, size, and quantization level, and buffer fullness, as well as the number of intra blocks in a frame, slab size and quantization level, and the number of slab intra blocks. One software tool that can be used for computing these statistics is WMStats, which is included in Windows Media system developer kits (SDKs) that are commercially available from Microsoft Corp., Redmond, Wash.

Besides the compression statistics, the S×S process needs to know at least the following compression constraints:

target bit rate;
peak bit rate (needed for VBR encoding only); and
buffer size (needed for CBR encoding) and/or peak buffer size (needed for VBR encoding). The buffer size constraint may also be provided for VBR encoding.

Figure 3A:
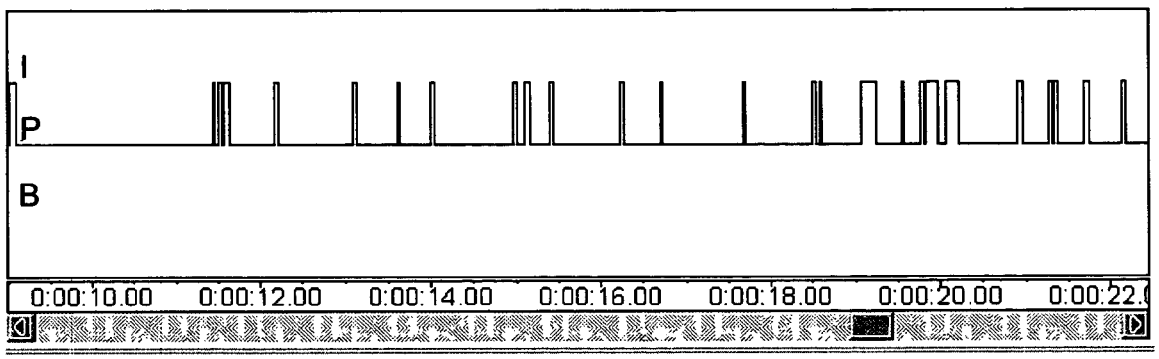
FIGS. 3A, 3B, 3C, 3D, and 3E depict compression statistics for a video segment.
Figure 3B:
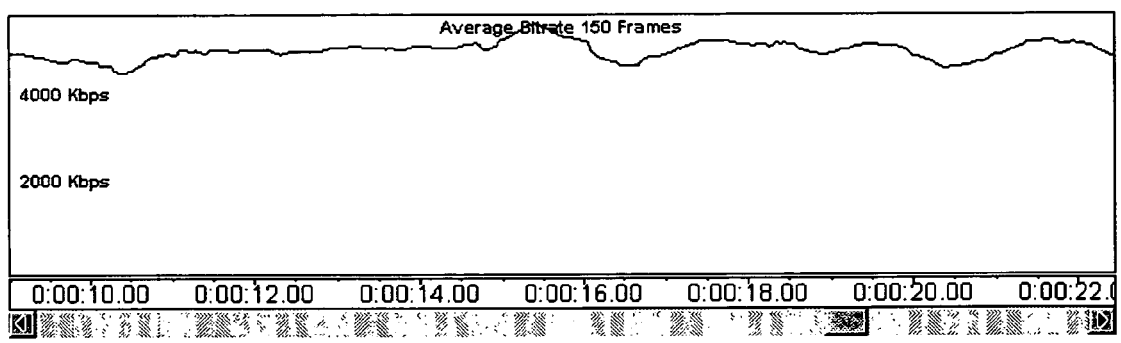
Figure 3C:
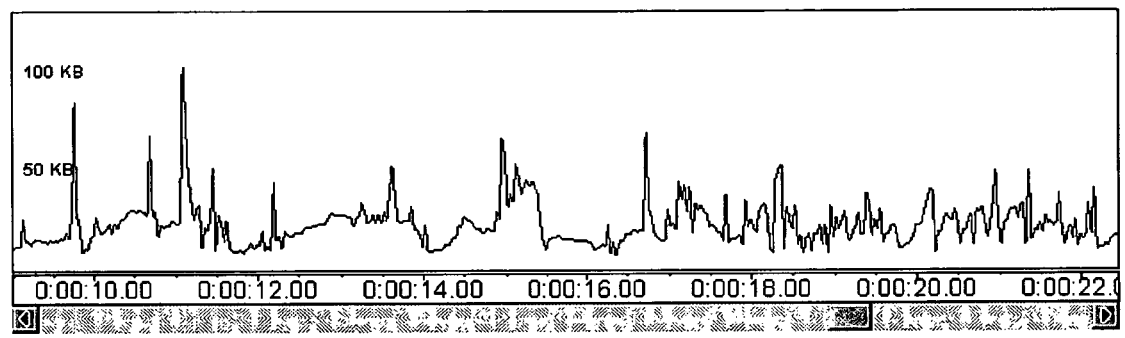
Figure 3D:
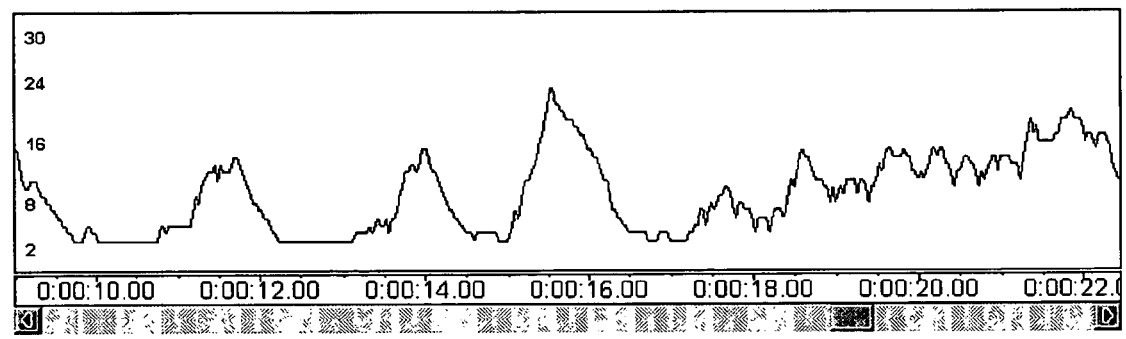
Figure 3E:
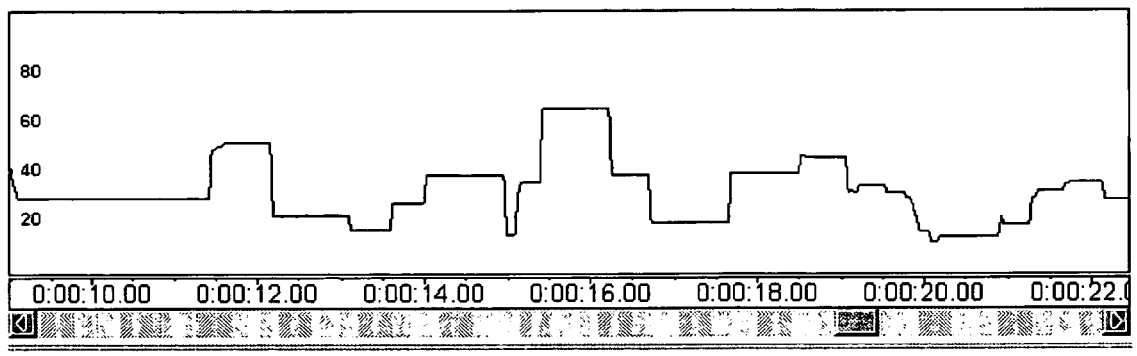

While not necessary to the S×S compression process, it can be helpful to present one or more of the compression statistics on a display, such as a computer monitor, in order to facilitate human operator interaction with the processing. For example, FIG. 3A is a time line showing the frame-type statistic as I-, P-, and B-picture types encoded at frame time-codes during a video segment. FIG. 3B is a time line of the average bit rate statistic calculated at frame time codes during a video segment, and showing that the average bit rate ranged from about 40 Kbps to about 50 Kbps during that segment. At each point, the average of the preceding 150 frames was calculated. FIG. 3C is a time line of the compressed frame size statistic calculated at frame time codes during a video segment, and showing that the compressed frame size ranges from about 10 KB to about 100 KB for that segment. FIG. 3D is a time line of the frame-average quantization level statistic calculated at frame time codes during a video segment, and showing that the average quantization level ranges from about 2 to about 24 during that segment. FIG. 3E is a time line the buffer fullness statistic calculated for each frame identified by time codes in a video segment, and showing that buffer fullness ranged from about 15% to about 65% during that segment.

Identifying Scenes for Re-encoding

A scene or segment of a compressed data stream is identified for S×S processing by setting mark-in and mark-out points, which are advantageously simply frame numbers or time-codes, that identify the start and end of the scene. To avoid complications involving coding of different frame types, mark-in points are preferably either I- or P-pictures and mark-out points are preferably frames immediately preceding I-pictures.

Scenes may be identified in a number of ways, for example by monitoring a parameter that indicates compressed picture quality. One or more of the compression statistics can advantageously be used as such a parameter; for example, higher values of quantization level usually correspond to poorer perceived quality and lower values of quantization level usually correspond to better perceived quality. For example, an image area that is "easy to encode", such as a flat field, can be given a higher quantization level (i.e., fewer bits) and yet the same perceived quality can be achieved. The bits saved by using the higher quantization level can be used to encode a more "difficult" area, i.e., an area that is more visually complex, and improve the quality of the difficult area.

Figure 4:
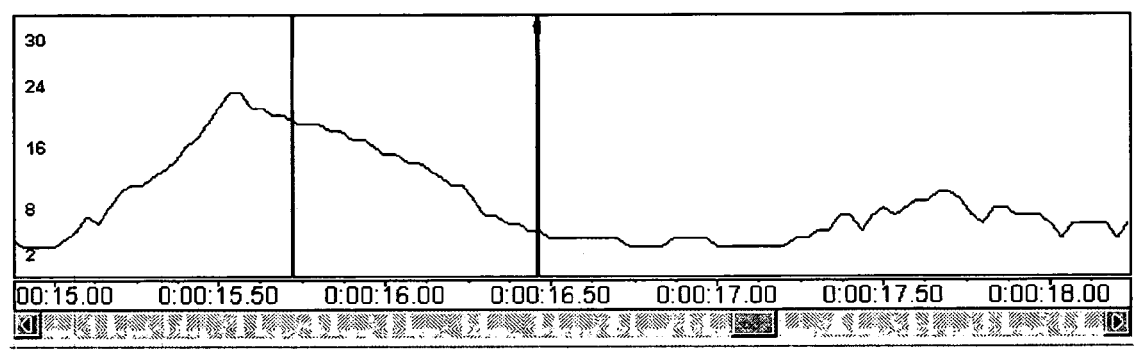
FIG. 4 is a chart of compressed frame quantization level for a video segment.

FIG. 4 charts compressed frame quantization levels on the vertical axis for frames identified by time codes on the horizontal axis. In FIG. 4, the vertical line at a time code of about 0:00:15.70 is a visual indication of a mark-in point and the vertical line at a time code of about 0:00:16.45 is a visual indication of a mark-out point. It will be understood that mark-in and mark-out points can be similarly indicated on charts of other compression statistics, and for a user interface, the points can be highlighted with different colors or icons as desired.

From FIG. 4, it can be seen that the frame at which the quantization level crosses a suitable threshold in one direction (In FIG. 4, a quantization level of about 20) can be set as a mark-in point and the frame at which the quantization level re-crosses that threshold or crosses another suitable threshold (in FIG. 4, a quantization level of about 6) can be set as a mark-out point. For another example, a frame in a sequence for which the quantization level is greater than about 12 (in FIG. 4, the frame at time code 0:00:15.30) may be set as a mark-in point and the frame in the sequence for which the quantization level drops below about 12 (in FIG. 4, the frame at time code 0.00:16.20) may be set as a mark-out point. In setting mark-in and mark-out points, it is preferable to ensure that the length of the included scene is at least a few frames, and so it is advantageous to set mark-in/mark-out points based on a sliding accumulation or average of the quantization levels of a number of frames.

Accordingly, setting mark-in and mark-out points can be carried out by a suitably programmed processor, such as the processors indicated in FIGS. 2A and 2B. It will be appreciated that a user may assist such a processor or manually set such mark-in and mark-out points based on the user's view of a display of a parameter that indicates compressed picture quality. As indicated above, it is currently believed that quantization level is a suitable such parameter.

Determining Bit Rates

For purposes of this application, the video segment between a mark-in point and a mark-out point is a scene, and such a scene is a video segment that is to be re-encoded. As noted above, a scene in the original encoded content that is to be re-encoded starts on I-picture (the mark-in point) and ends on a frame just before a subsequent I-picture (the mark-out point).

A maximum or substantially maximum buffer fullness at the mark-out point that does not violate the compression constraints typically yields a scene having the best allowable visual quality. The buffer fullness at the mark-out point can be called the scene's final buffer fullness, and the buffer fullness value at the mark-in point can be called the scene's initial buffer fullness. The initial buffer fullness can be readily computed from a knowledge of the compression format in use. Many video standards define so-called hypothetical reference decoders (HRDs), and a video bit stream encoded according to a particular standard is required to meet the constraints imposed by the respective HRD. Included in the definition of an HRD is how to compute buffer fullness. For example, the VC-1, AVC, and MPEG-2 standards describe how to compute buffer fullness.

A scene's final buffer fullness can be determined in a number of ways. One advantageous method of determining final buffer fullness is recursive: the S×S process chooses a final buffer fullness value, calculates buffer fullness values for the frames in the rest of the scene given the chosen final value, and determines whether the chosen final value yields a bit stream that meets the constraints of the applicable HRD. If it does, then the chosen value is acceptable as the final buffer fullness. For example, let 100% be chosen as the final buffer fullness; using the applicable HRD, calculate forward and compare the resulting bit stream to the constraints of the HRD. If the calculations indicate that the bit stream does not violate the constraints of the HRD, then 100% is acceptable as a final buffer fullness value. If otherwise, choose a lower final buffer fullness value and calculate forward again. Iterate until the highest or substantially the highest final buffer fullness value that does not cause the HRD to be violated is chosen.

Figure 5:
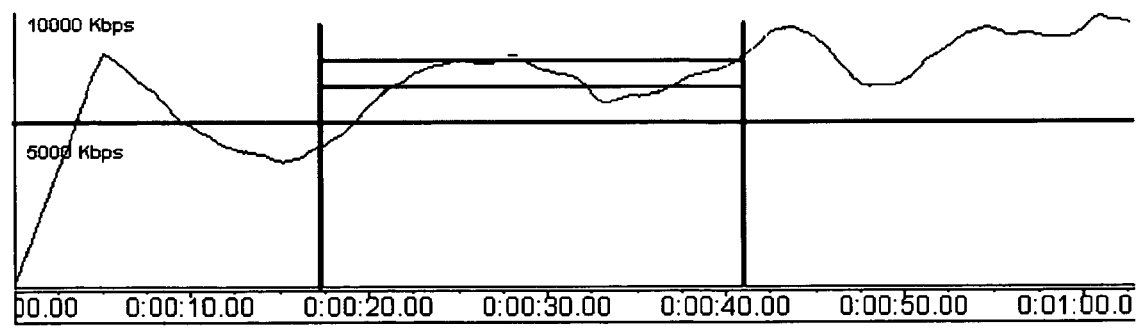
FIG. 5 is a chart of average bit rate for a video segment.

FIG. 5 is a chart of the 150-frame average bit rate of a segment of frames identified by time codes, including a scene demarcated by a mark-in point at a time code of about 0:00:17 and a mark-out point at a time code of about 0:00:41. The average bit rate for the scene, about 7500 Kbps, is indicated by the lower horizontal line segment between the mark-in/out points, and this information can be presented on a display if desired. From one point of view, the S×S process increases the visual quality of the re-encoded scene by increasing the average bit rate such that the buffer fullness at the mark-out point is increased, preferably to the maximum that does not violate the compression constraints.

The number of frames in a scene is determined by the mark-in and mark-out points, which likewise determine the scene's duration. This information, the initial buffer fullness, the maximum final buffer fullness, and the compressed content's profile determine the maximum allowable average bit rate for the scene, which is indicated in FIG. 5 by the upper horizontal line segment. With this maximum allowable value known, the scene's original average bit rate is increased up to the maximum, or at least nearer to it. It will be understood that re-encoded frame sizes are approximated based on available information, and so they will not be accurate to the bit. Thus, can be desirable to increase the bit rate to less than the indicated maximum to avoid overshooting the bit rate during re-encoding and thus violating the bit stream constraints.

Determining Compression Parameters

Based on the new average bit rate for the scene, how to re-encode the source content while maintaining the compression profile's constraints is determined from the aforementioned statistics. For example, it may be known from the statistics that frame N of type T compressed to size S utilizing a quantization level Q, and it may also be known that frame N has associated with it a complexity value C. It will be understood that the complexity of a frame is based on the frame size and quantization levels of that frame, and there may be a linear relationship among complexity, size, and quantization level, although other relationships may be used. This complexity value needs to support at least an approximate functional relationship between Q, T, and S, such that:

$$S \approx f(T, Q, C)$$

Increasing the scene's average bit rate changes a frame's target size. For example, if the average bit rate increases by 20%, the target frame size S can increase 20%. The new target frame size may be called Snew. Given the new average bit rate and the compression constraints, a new frame size Snew for each frame can be calculated. For example, if the increase is evenly distributed among all of the frames in the scene, then Snew=S×% change, and a target frame size S of 100 increased by 20% becomes a new target frame size Snew of 120. It will be appreciated that it is not always necessary, and sometimes not advisable, to evenly distribute an increase in average bit rate among all frames in a scene. For example, one should limit the increase in frame size to ensure that the HRD does not exceed its buffer constraint.

Once Snew has been computed for each frame of the scene, a new quantization level Qnew is computed for each re-encoded frame. It is preferable that Snew and Qnew are at least approximately functionally related, such that:

$$Q\text{new} \approx f(T, C, S\text{new}, S, Q)$$

The value of C and this functional relationship are important to accurately producing Snew when the scene is re-encoded. Quantization level changes have more impact on visually complex frames than on visually simple frames. For example, a flat field will compress well and not change size over a wide range of Q. From another point of view, quantization can be thought of as removing information, and so quantization level changes have less impact in frames having less information (i.e., less visually complex frames). Thus, including at least some measure of complexity helps to refine Qnew based on a target Snew.

For the scene to be re-encoded, all other encoding parameters/directives are unchanged from the last pass.

Compress Scene

The scene can then be re-encoded according to the parameters. It can be advantageous to check the visual quality of the re-encoded scene so that a decision can be made to accept or reject it. One way to check the visual quality of a re-encoded scene is to monitor a parameter that indicates compressed picture quality. For example, the quantization level can be checked to ensure that it is within the threshold(s) described above in connection with identifying the scene for re-encoding. It can also be advantageous to present the re-encoded scene on a display so that a user has the opportunity to accept or reject the re-encoded content. If rejected, the S×S process can be re-applied to the scene.

Integrating into Content

A re-encoded scene can be easily integrated into the original compressed content by simply replacing the frames having time codes between the mark-in and mark-out points.

The S×S process described above is useful in a number of common video processing scenarios. Two exemplary scenarios are described below.

Scenario 1: Initial Encode Rate<Actual Target Rate

Assume that a user plans to encode a two-hour movie with a target bit rate of 7 megabits per second (Mbps). This will yield a file size of approximately 7200 sec×7 Mbps=50400 Mb, or approximately 6300 megabytes (MB).

The user first either 1-pass or 2-pass encodes the movie at a rate lower than the target 7 Mbps. For example, the user could encode at 6.3 Mb/sec or equivalently choose to reserve 10% of the target bit rate of 7 Mb, which would result in a file size of approximately 5670 MB, or 10% less than 6300 MB.

The difference in file sizes, 630 MB, is available for use by the S×S process, which is to say that selected scenes can be re-encoded at higher bit rates. If the user actually uses all of these bits, then the resultant file will be 6300 MB in size.

Scenario 2: Adjusting Target Rate for S×S Processing

As in Scenario 1, assume that a user plans to encode a two-hour movie with a target bit rate of 7 Mbps, which will yield a target file size of approximately 6300 MB.

The user either 1-pass or 2-pass encodes the movie at the target rate. When encoding is complete, the actual file size is determined, and the user can now adjust the target file size and increase or vary the bits allocated to different scenes.

Those of skill in this art will understand that motion video encoders that use motion estimation (e.g., that generate P- and B-pictures) generate and use reconstructed images (which are also sometimes called reference frames, reference images, and other names) that are necessary for computing motion vectors. An image that is currently being encoded is compared to the reconstructed version of one or more temporally nearby images to compute motion vectors. Reconstructed images are computed by reversing the encoding steps that were used to encode the original image, resulting in duplicates of the images that will be produced when the resulting encoded bitstream is decoded.

It will be appreciated that procedures described above may be carried out repetitively as necessary, for example, to respond to time-varying characteristics of a video signal. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within an article of manufacture including any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can store, the program for use by or in connection with the instruction-execution system, apparatus, or device. More specific examples (a non-exhaustive list) of the computer-readable medium include a portable computer diskette, a random-access memory (RAM), a read-only memory (ROM), and an erasable programmable read-only memory (EPROM or Flash memory).

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of processing a compressed video signal that includes a succession of image frames and that is a compressed version of an original source video signal, the method comprising:

analyzing the compressed video signal in a digital video encoder to generate one or more compression statistics;

identifying in the digital video encoder a scene of the compressed video signal for re-encoding based on at least one of the compressed video signal and the compression statistics;

selecting in the digital video encoder a target bit rate for re-encoding the identified scene based on the compression statistics and applicable compression constraints;

determining in the digital video encoder compression parameters for the identified scene based on the identified scene's compression statistics and the selected target bit rate;

re-encoding in the digital video encoder image frames for the identified scene from the original source video signal based on the determined compression parameters, thereby generating a new compressed scene;

checking in the digital video encoder a visual quality of the new compressed scene; and integrating in the digital video encoder the new compressed scene into the compressed video signal if the visual quality is sufficient.

2. The method of claim 1, wherein the compressed video signal is analyzed during compression of original source material.

3. The method of claim 1, wherein the compression statistics comprise at least one of a frame number, a time-code, a frame type, a compressed bit rate, a compressed frame size, a frame-average quantization level, a buffer fullness, and a frame complexity.

4. The method of claim 1, wherein the applicable compression constraints comprise at least one of a target bit rate, a buffer sizes peak buffer size, and a peak bit rate.

5. The method of claim 1, further comprising presenting at least one compression statistic on a visual display.

6. The method of claim 1, wherein identifying the scene comprises setting a mark-in point and a mark-out point that respectively identify a start and an end of the scene.

7. The method of claim 6, wherein the mark-in point is set at at least one of an intra coded frame and a forward predictive coded frames and the mark-out point is set at a frame that precedes an intra coded frame.

8. The method of claim 1, wherein identifying the scene comprises comparing a parameter that indicates compressed picture quality to at least one threshold value.

9. The method of claim 8, wherein the parameter is a frame-average quantization level.

10. The method of claim 8, wherein the parameter is a sliding accumulation of a frame-average quantization level.

11. The method of claim 1, wherein the compressed video signal is analyzed after compression of original source material.

12. The method of claim 1, wherein selecting the target bit rate for re-encoding the identified scene comprises:
   determining a maximum target bit rate for re-encoding the identified scene based on the compression statistics and applicable compression constraints; and
   selecting the target bit rate for re-encoding the identified scene based on the determined maximum target bit rate.

13. The method of claim 12, wherein the maximum target bit rate is based on the number of frames in the scene, an initial buffer fullness, and a maximum final buffer fullness.

14. The method of claim 13, wherein the maximum final buffer fullness is determined by choosing a final buffer fullness value, calculating buffer fullness values for frames in the scene given the chosen final value, and determining whether the chosen final value yields a bit stream that meets constraints of a hypothetical reference decoder.

15. An article of manufacture comprising a non-transitory computer readable medium having computer-readable instructions embodied therein for processing compressed video signal that includes a succession of image frames and that is a compressed version of an original source video signal, the article of manufacture comprising:
   computer-readable instructions for analyzing the compressed video signal to generate one or more compression statistics; computer-readable instructions for identifying a scene of the compressed video signal for re-encoding based on at least one of the compressed video signal and the compression statistics;
   computer-readable instructions for selecting a target bit rate for re-encoding the identified scene based on the compression statistics and applicable compression constraints;
   computer-readable instructions for determining compression parameters for the identified scene based on the identified scene's compression statistics and the selected target bit rate;
   computer-readable instructions for re-encoding image frames for the identified scene from the original source video signal based on the determined compression parameters, thereby generating a new compressed scene;
   computer-readable instructions for checking a visual quality of the new compressed scene; and
   computer-readable instructions for integrating the new compressed scene into the input compressed video signal if the visual quality is sufficient.

16. The article of manufacture of claim 15, wherein the compression statistics comprise at least one of a frame number, a time-code, a frame type, a compressed bit rate, a compressed frame size, a frame-average quantization level, a buffer fullness, and a frame complexity.

17. The article of manufacture of claim 15, wherein the applicable compression constraints comprise at least one of a target bit rate, a buffer size, ad peak buffer size, and a peak bit rate.

18. The article of manufacture of claim 15, wherein the computer-readable instructions for identifying comprises computer-readable instructions for setting a mark-in point and a mark-out point that respectively identify a start and an end of the scene.

19. The article of manufacture of claim 18, wherein the mark-in point is set at at least one of an intra coded frame or a forward predictive coded frame, and the mark-out point is set at a frame that precedes an intra coded frame.

20. The article of manufacture of claim 15, wherein the computer-readable instructions for identifying comprises computer-readable instructions for comparing a parameter that indicates compressed picture quality to at least one threshold value.

21. The article of manufacture of claim 20, wherein the parameter is a frame average quantization level.

22. The article of manufacture of claim 15, wherein the computer-readable instructions for selecting the target bit rate comprises:
   computer-readable instructions for determining a maximum target bit rate for re-encoding the identified scene based on the compression statistics and applicable compression constraints; and
   computer-readable instructions for selecting the target bit rate for re-encoding the identified scene based on the determined maximum target bit rate.

23. The article of manufacture of claim 22, wherein the maximum target bit rate is based on the number of frames in the scene, an initial buffer fullness, and a maximum final buffer fullness.

24. The article of manufacture of claim 23, wherein the maximum final buffer fullness is determined by choosing a final buffer fullness value, calculating buffer fullness values for frames in the scene given the chosen final value, and determining whether the chosen final value yields a bit stream that meets constraints of a hypothetical reference decoder.

* * * * *

UNITED STATES PATENT AND TRADEMARK OFFICE
CERTIFICATE OF CORRECTION

PATENT NO. : 7,864,840 B2  Page 1 of 1
APPLICATION NO. : 11/106906
DATED : January 4, 2011
INVENTOR(S) : Labrozzi et al.

It is certified that error appears in the above-identified patent and that said Letters Patent is hereby corrected as shown below:

On the Cover:
Item (56) References Cited, U.S. Patent Documents:
  Please delete "6,040,881 A  3/2000  Koyama"
  and insert -- 6,040,861  3/2000  Boroczky et al. --

Signed and Sealed this
Twenty-third Day of August, 2011

David J. Kappos
*Director of the United States Patent and Trademark Office*